United States Patent
Fujii

(10) Patent No.: US 7,447,779 B2
(45) Date of Patent: Nov. 4, 2008

(54) METHOD FOR PERFORMING A WIRELESS COMMUNICATION BY A WIRELESS COMMUNICATION APPARATUS WITH AN ACCESS POINT AND ESTABLISHING A CONNECTION WITH A NETWORK THROUGH THE ACCESS POINT

(75) Inventor: Kenichi Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 10/408,326

(22) Filed: Apr. 7, 2003

(65) Prior Publication Data
US 2003/0195966 A1    Oct. 16, 2003

(30) Foreign Application Priority Data
Apr. 11, 2002   (JP)   ............................. 2002-109363

(51) Int. Cl.
*G06F 15/16* (2006.01)
(52) U.S. Cl. .................. 709/227; 709/217; 709/218; 709/228; 709/250
(58) Field of Classification Search .................. 709/220, 709/224, 227, 217, 218, 228, 250; 455/432, 455/525
See application file for complete search history.

(56) References Cited

U.S. PATENT DOCUMENTS

| | | | | |
|---|---|---|---|---|
| 6,438,385 | B1 * | 8/2002 | Heinonen et al. | 455/501 |
| 6,510,463 | B1 * | 1/2003 | Farhat et al. | 709/224 |
| 6,813,508 | B1 * | 11/2004 | Shioda et al. | 455/525 |
| 7,065,100 | B2 * | 6/2006 | Yoshida et al. | 370/465 |
| 2001/0024953 | A1 * | 9/2001 | Balogh | 455/432 |
| 2002/0069284 | A1 * | 6/2002 | Slemmer et al. | 709/227 |
| 2004/0003060 | A1 * | 1/2004 | Asoh et al. | 709/220 |

FOREIGN PATENT DOCUMENTS

| | | |
|---|---|---|
| EP | 1 102 454 A1 | 5/2001 |
| JP | 8-154273 | 6/1996 |
| JP | 10-327463 | 12/1998 |
| JP | 2000-295650 | 10/2000 |
| JP | 2001-309866 | 11/2001 |

* cited by examiner

*Primary Examiner*—Quang N. Nguyen
(74) *Attorney, Agent, or Firm*—Morgan & Finnegan, LLP

(57) ABSTRACT

A wireless communication apparatus performs wireless communication with an access point, and establishes a connection with a network through the access point. The wireless communication apparatus detects an attribute of the access point, and employs the detected attribute to select procedures for communication across the network.

8 Claims, 10 Drawing Sheets

FIG. 6

| | DEVICE PRIORITY TABLE | |
|---|---|---|
| 601 — 1 | LAN-AP | — 604 |
| 602 — 2 | MODEM | — 605 |
| 603 — 3 | MOBILE PHONE | — 606 |

| ACCESS POINT TYPE (DEVICE CLASS) 900 | SERVICE REQUEST LIST 901 |
|---|---|
| MODEM (902) | PROFILE |
| | AP PHONE NUMBER |
| | DHCP·DNS SERVER |
| | PROTOCOL TYPE |
| MOBILE PHONE (903) | PROFILE |
| | AP PHONE NUMBER |
| | PACKET DATA TYPE |
| LAN-AP (904) | PROFILE |
| | PROTOCOL TYPE |
| | DHCP·DNS SERVER (PROTOCOL TYPE BASED) |

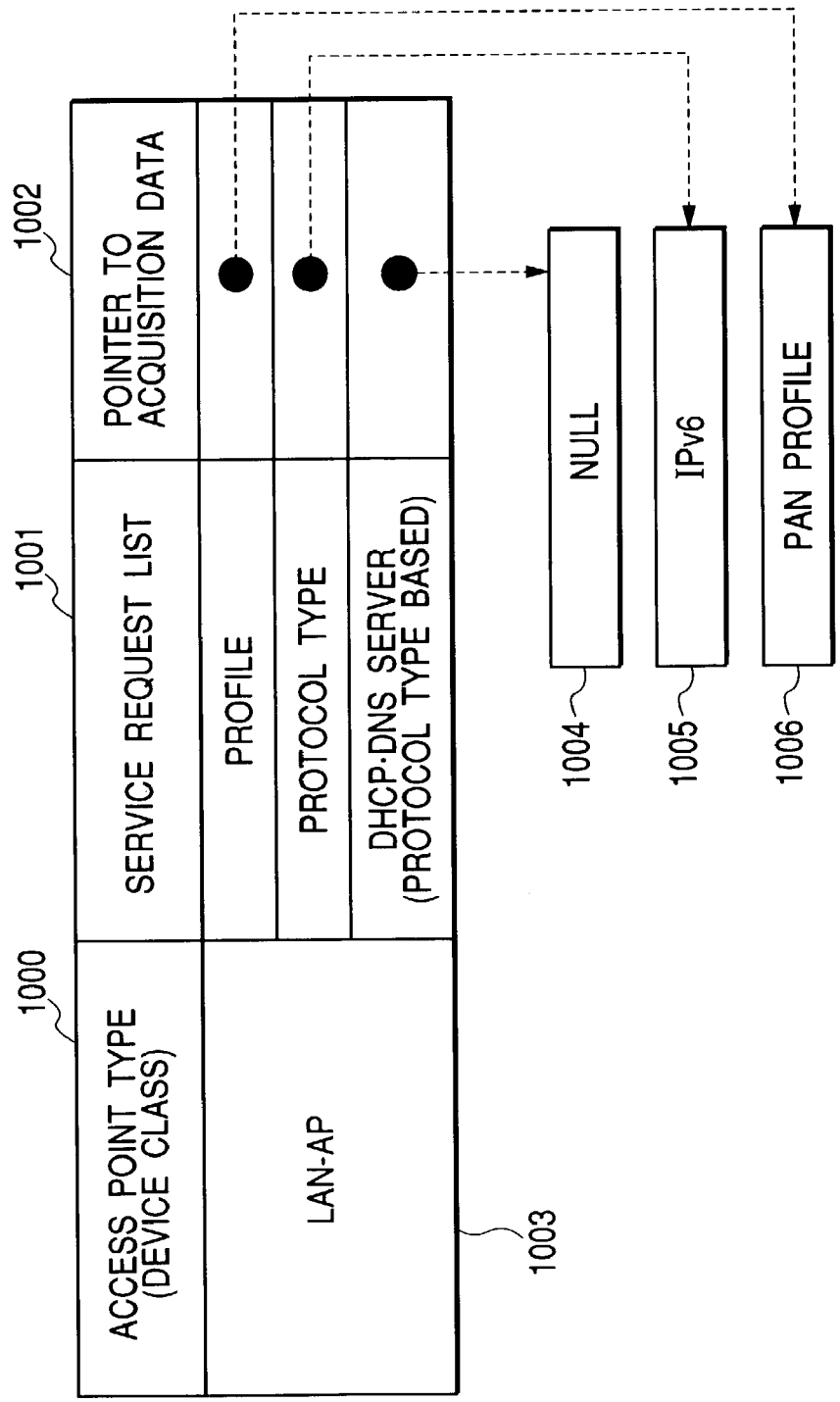

METHOD FOR PERFORMING A WIRELESS COMMUNICATION BY A WIRELESS COMMUNICATION APPARATUS WITH AN ACCESS POINT AND ESTABLISHING A CONNECTION WITH A NETWORK THROUGH THE ACCESS POINT

BACKGROUND OF THE INVENTION

1. Field of the Invention

The present invention relates to a wireless communication control apparatus.

2. Related Background Art

Conventionally, a terminal having a communication function is employed to perform Internet data communication, and various connection forms are available for this purpose. As an example connection form, a terminal may be connected directly to a modem (TA), or by a cable to a cellular phone, and a dial-up connection used to access the Internet, or a terminal may directly access a LAN via a hub and an Ethernet cable.

Further, a cableless connection to the Internet or to a network may be implemented by connecting a terminal using wireless communication, according to one of the wireless standards, such as Bluetooth. Therefore, a method has been proposed whereby a terminal may be employed to select at least one of the Internet protocols, a point-to-point protocol (PPP), a TCP/IP protocol or an IP protocol, to connect to a communication network.

According to this method, as is disclosed, for example, in EP1102454, user and communication setup information are stored in a host apparatus, and based on the stored information, a protocol is selected for connecting to a communication network.

With the above method, it is anticipated that an apparatus for which mobility is a feature, such as a terminal that uses short-distance wireless communication provided, for example, by Bluetooth, can be connected to the Internet by using an access point other than one that has been designated and stored in advance. That is, the access point must be changed in accordance with the various locations at which the apparatus may be employed.

In order to use the above method to change to an access point in agreement with the physical location, the user of a terminal device must, in advance, enter a large amount of data to be used for the selection of an access point from among those set up using the above method. Further, in addition to the heavy load the entry of data imposes on a user, deterioration of the usability of the apparatus will continue until an appropriate access point can be selected.

SUMMARY OF THE INVENTION

To resolve the conventional shortcomings, it is one objective of the present invention to contribute to the improvement of the usability for a user.

It is another objective of the present invention, when the Internet is to be accessed, to enable the switching of access points in accordance with a location or a priority level.

It is an additional objective of the present invention to change connection parameters, in accordance with a device class at an Internet access point (AP), so that making a connection is easy, even when multiple apparatuses coexist.

It is a further objective of the present invention to eliminate the complicated setup required of a user, and to smoothly provide an Internet connection.

The other objectives of the present invention will become apparent during the course of the following description, given for the preferred embodiments.

BRIEF DESCRIPTION OF THE DRAWINGS

FIG. 6 is a diagram showing an example device priority table for a wireless communication control apparatus according to a second embodiment of the present invention when a connection priority order is provided for device classes;

FIG. 9 is a diagram showing an example service request list for each required device class when a service request is issued by the wireless communication control apparatus according to the third embodiment of the present invention; and FIG. 10 is a diagram showing example memory contents when the wireless communication control apparatus according to the third embodiment of the present invention has received, as a service request response signal, a value for the service request list for each device class.

DESCRIPTION OF THE PREFERRED EMBODIMENTS

First Embodiment

A first embodiment of the present invention will now be described while referring to FIGS. 1 to 5.

Figure 1:
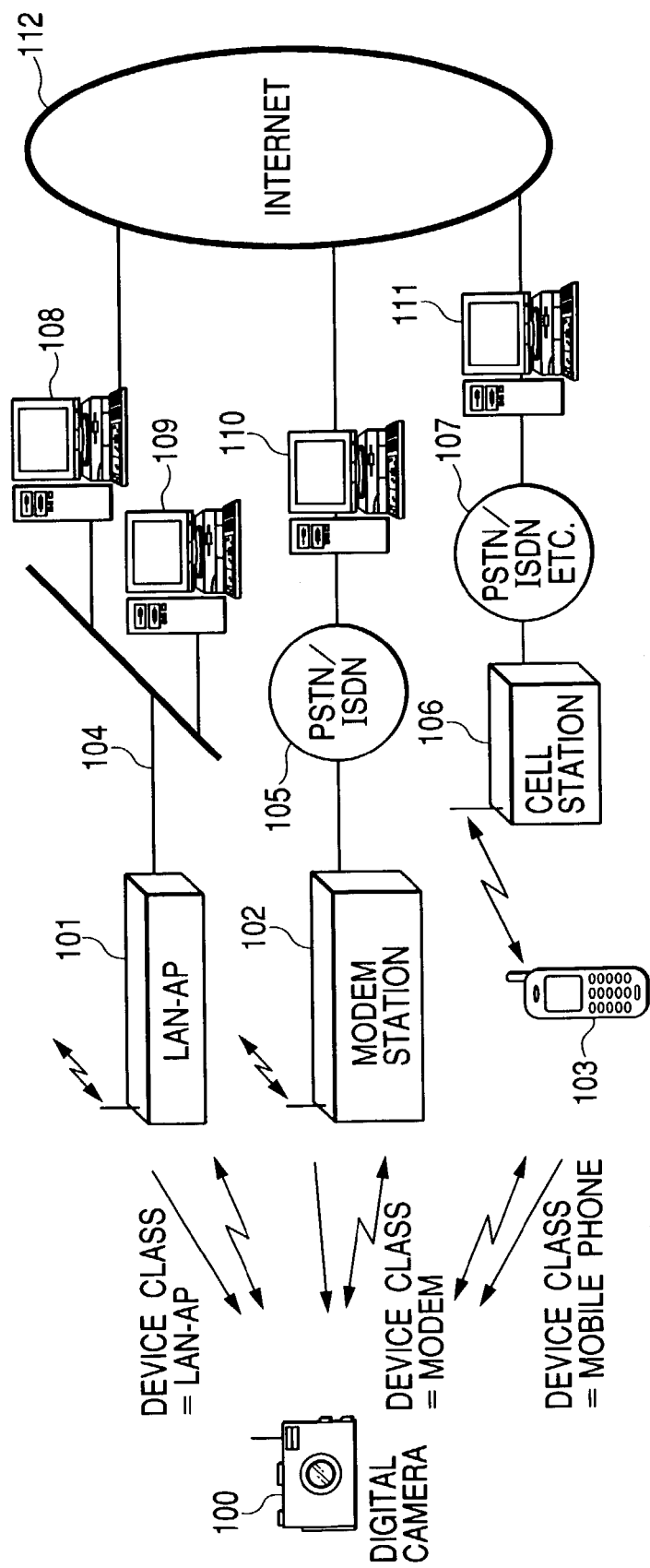
FIG. 1 is a diagram showing the configuration of an Internet wireless data communication system that includes a wireless communication control apparatus according to a first embodiment of the present invention.

FIG. 1 is a diagram showing the configuration of a data communication system having a wireless communication control apparatus according to the first embodiment of the present invention.

In FIG. 1, a digital camera 100 includes a wireless communication function. A LAN access point (LAN-AP) 101 is equipped with an interface, for a connection to a local area network (LAN) 104 through which it is connected to a first server 108 and a second server 109. A modem (modem station) 102 can be connected through a public network (PSTN/ISDN) 105 to a service provider 110. A cellular phone (mobile phone) 103 can be connected to an Internet server 111 through a cell station 106 and across a public network (PSTN/ISDN) 107. And the digital camera 100, the modem 102 and the cellular phone 103 are connected through wireless communication, and can exchange data across the Internet 112.

Figure 2:
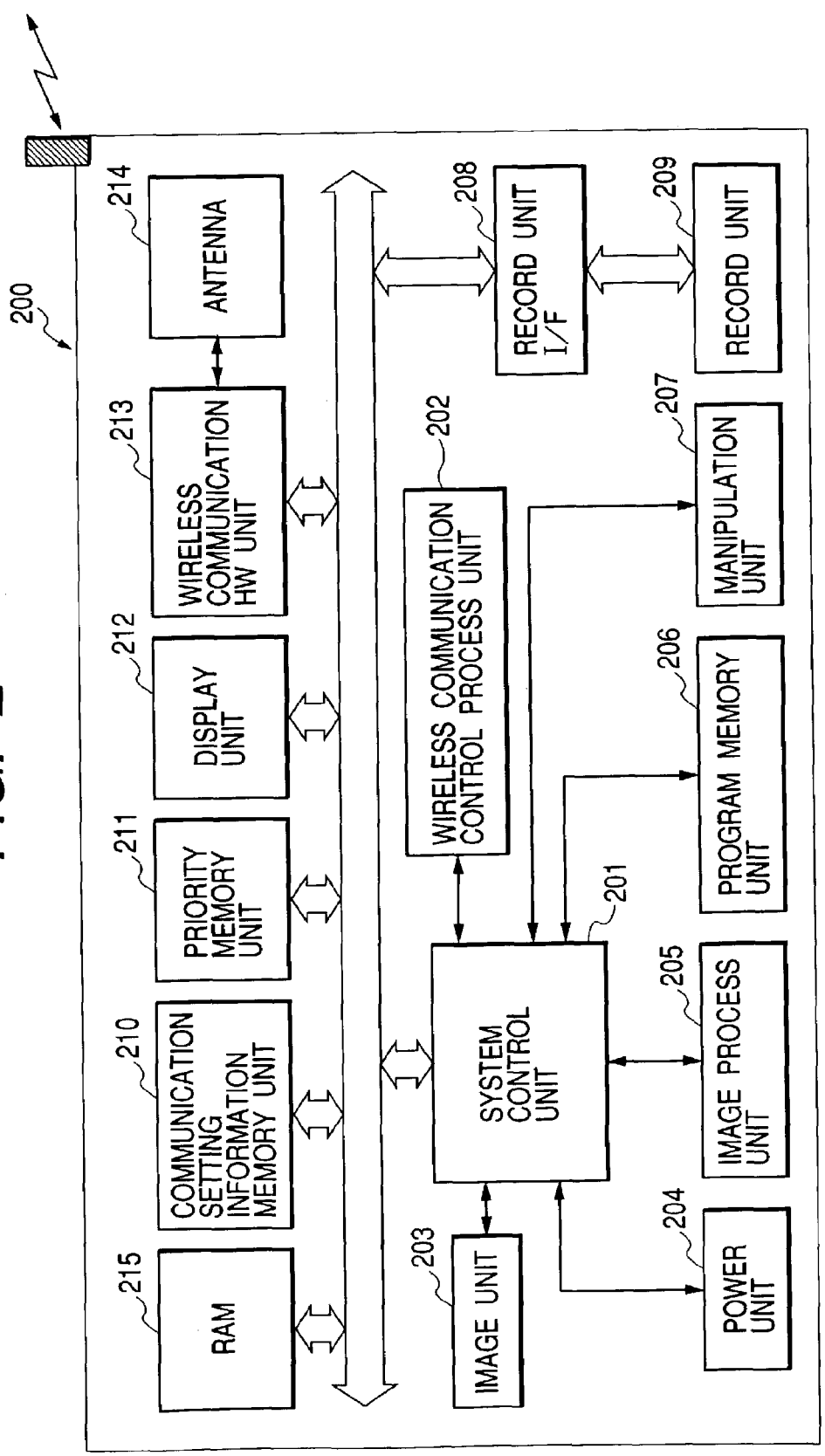
FIG. 2 is a block diagram showing the configuration of a digital camera for the wireless communication control apparatus according to the first embodiment of the present invention.

FIG. 2 is a block diagram showing the arrangement of the functional sections of the digital camera 100 in FIG. 1 that have the wireless communication function.

In FIG. 2, a digital camera main body 200 includes a system control unit 201, a wireless communication control process unit 202, an image unit 203, a power unit 204, an image process unit 205, a program memory unit 206, a manipulation unit 207, a record unit interface (I/F) 208, a record unit 209, a communication setting information memory unit 210, a priority memory unit 211, a display unit 212, a wireless communication hardware (HW) unit 213, an antenna 214 and a RAM 215. It should be noted, however, that the priority memory unit 211 is not required for this embodiment, but is employed for a second embodiment, which will be described later.

The wireless communication control process unit 202 has a function for connecting, using wireless communication, the digital camera 100 with the LAN-AP 101, the modem 102 and the cellular phone 103 in FIG. 1. The wireless communication control process unit 202 transmits an inquiry signal and data based on an instruction issued by the system control unit 201, and receives an inquiry response signal and data based on the instruction issued by the system control unit 201.

The wireless communication control process unit 202 also has a function for detecting an AP attribute for the present invention, an Internet connection function, and an AP service search function. The thus arranged wireless communication control process unit 202 reads a program from the program memory unit 206 and employs the program to control the individual functional sections.

Figure 3:
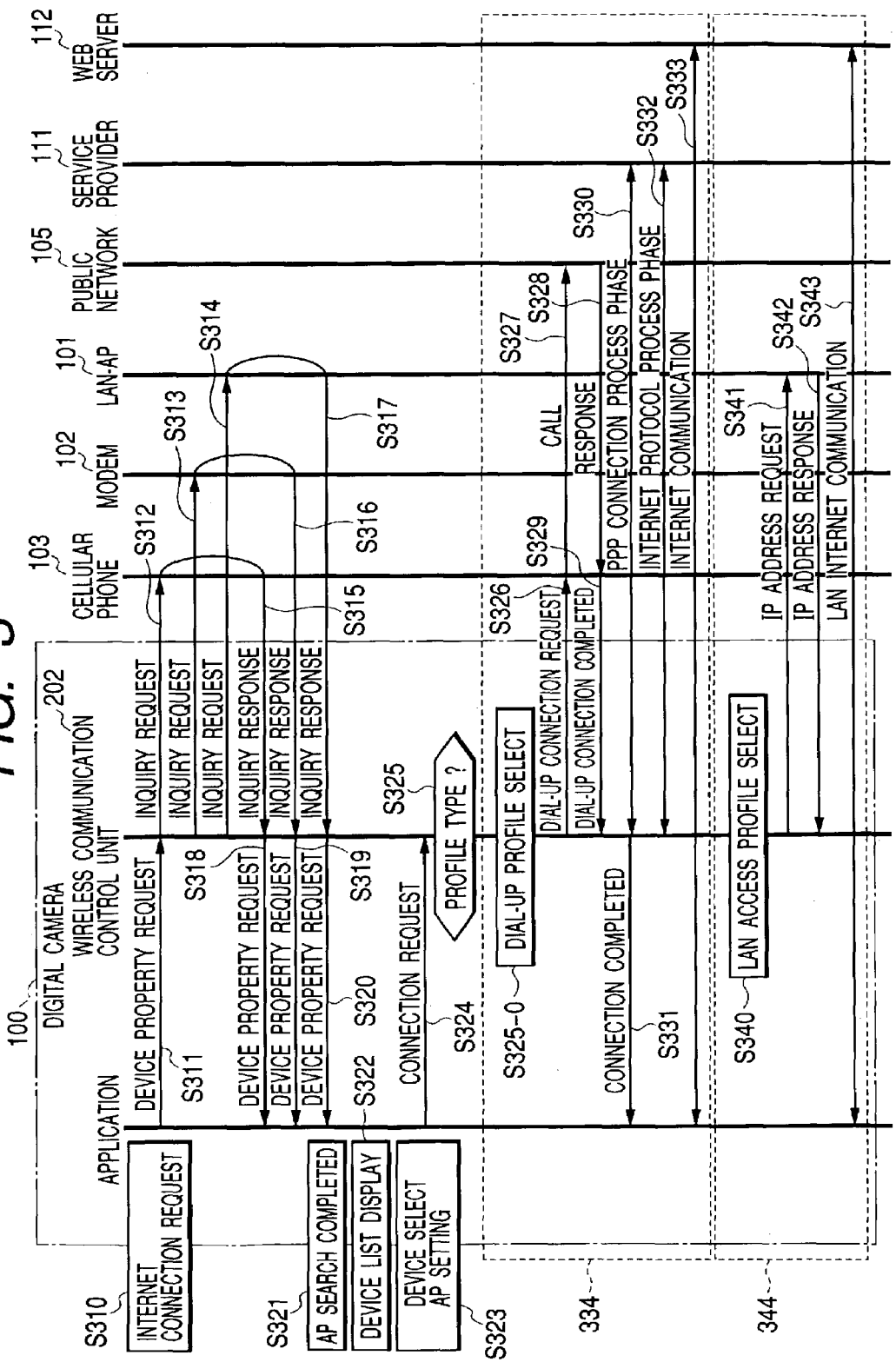
FIG. 3 is a diagram showing a processing sequence, for the wireless communication control apparatus according to the first embodiment of the present invention, for performing an Internet connection in accordance with a device class included in a response signal received upon the issuance of an inquiry request.

FIG. 3 is a diagram showing the processing sequence when the digital camera 100 in FIG. 1, which has the wireless communication function, communicates with the Internet 112 through the access points (AP) of the LAN-AP 101, the modem 102 and the cellular phone 103.

First, an Internet connection request is generated by operating the manipulation unit 207, and is transmitted to the application (system control unit 201) (step S310). The application then issues a device attribute request to the wireless communication control process unit 202 (step S311). Upon receiving the device attribute request, the wireless communication control process unit 202 transmits to peripheral devices (the cellular phone 103, the modem 102 and the LAN-AP 101 in this embodiment) an inquiry request signal that serves as a broadcast signal (steps S312, S313 and S314).

Upon the reception of the inquiry signal from the wireless communication control process unit 202, the devices transmit, to the digital camera 100, response signals that include their device classes (steps S315, S316 and S317). When the digital camera 100 receives the response signals, the wireless communication control process unit 202 transmits a device attribute notification to the application (steps S318, S319 and S320). And when the application has received a designated number of responses, or when a waiting period for the responses to the inquiry has expired, the access point search is completed (step S321).

A device list, obtained as a result of the inquiry, is displayed on the display unit 212 (step S322), and from the list, the application selects a device, by operating the manipulation unit 207, for example, and sets up information related to the access point (step S323). Following this, the application issues a connection request to the wireless communication control process unit 202 (step S324), and the wireless communication control process unit 202 examines access point related information, which is stored in advance in the communication setting information memory unit 210, and refers to information that is associated with the type of profile to be used (step S325).

Step S334 is a sequence performed when the cellular phone 103 is the selected device.

First, information stored in the communication setting information memory unit 210 is selected for a profile required for a connection to the cellular phone 103 (step S325-0). In this embodiment, a dial-up profile is selected and the wireless communication control process unit 202 issues a request for a dial-up connection to the cellular phone 103 (step S326). The cellular phone 103 then calls the public network 105 (step S327), and when a response signal is received from a destination (service provider 111) (step S328), the cellular phone 103 transmits, to the wireless communication control process unit 202, a response signal indicating that the dial-up connection has been established (step S329).

In the digital camera 100. the wireless communication control process unit 202 performs a PPP connection process phase with the service provider (Internet server) 111 via through the cellular phone 103, e.g., authenticates the user (step S330), and transmits a connection completed notification to the application (step S331). Then, the wireless communication control process unit 202 performs the Internet network protocol process phase (TCP/IP), and after the link connection has been made (step S332), communication via the Internet is enabled (step S333).

Step 344 is a process sequence preformed when the LAN-AP 101 is selected as a device.

First, based on the information stored in the communication setting information memory unit 210, a profile required for a connection to the LAN-AP 101 is selected (step S340). In this embodiment, a LAN access profile is selected. The wireless communication control process unit 202 issues an IP address request to the LAN-AP 101 (step S341), and the LAN-AP 101 transmits an unused IP address to the wireless communication control process unit 202 (step S342). In this case, the LAN-AP 101 may transmit an inquiry to a DHCP server across the Internet 112, and when an IP address is allocated, the application can communicate with a WEB server across the Internet (Internet 112) (step S343).

Figure 4:
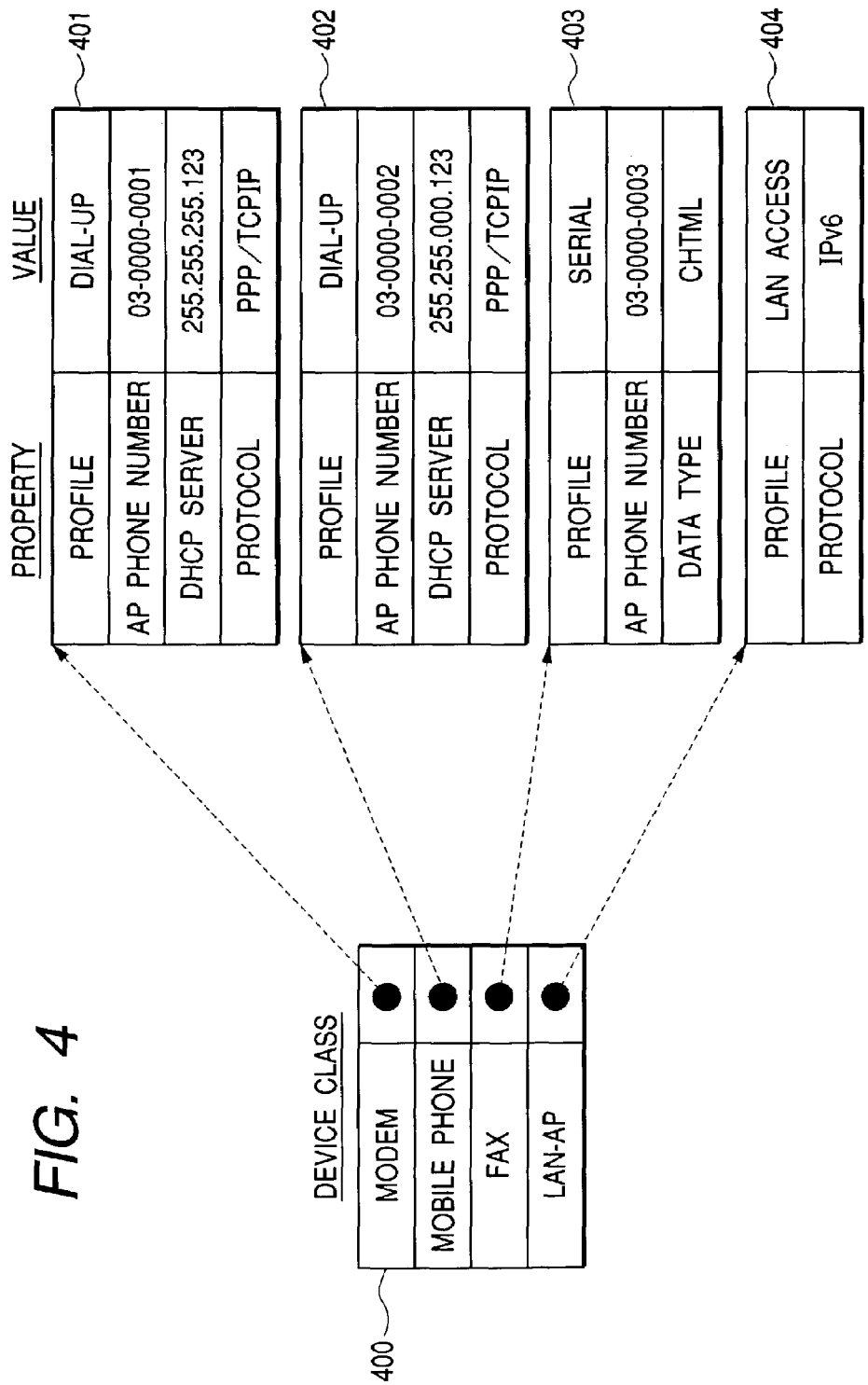
FIG. 4 is a diagram showing the contents of properties in a memory that are set in accordance with device classes for the wireless communication control apparatus according to the first embodiment of the present invention.

FIG. 4 is a diagram showing the correlation between device classes and properties and property values thereof, all of which are stored in the communication setting information memory unit 210 in FIG. 2.

In FIG. 4, a modem, a cellular phone (a mobile phone), a fax and a LAN-AP are provided as device class types 400. Properties and values 401 are used to indicate that a modem is a device class, and in this embodiment, "dial-up" is provided as a profile, 03-0000-0001 is an AP telephone number, 255.255.255.123 is a DHCP server, and PPP/TCPIP is a protocol. Similarly, properties and values 402 are used to indicate that a cellular phone is a device class; properties and values 403 are used to indicate a fax is a device class; and properties and values 404 are used to indicate a LAN-AP is a device class.

These values are stored in the communication setting information memory unit 210, and when a device is selected and the AP is designated, by employing the process shown in FIG. 3, the wireless communication control process unit 202 performs an appropriate process in accordance with these values.

That is, when the cellular phone 103 is selected, in accordance with the information in the communication setting information memory unit 210, the wireless communication control process unit 202 selects a dial-up profile. And when the LAN-AP 101 is selected, in accordance with the information in the communication setting information memory unit 210, the wireless communication control process unit 202 selects a LAN access profile.

Figure 5:
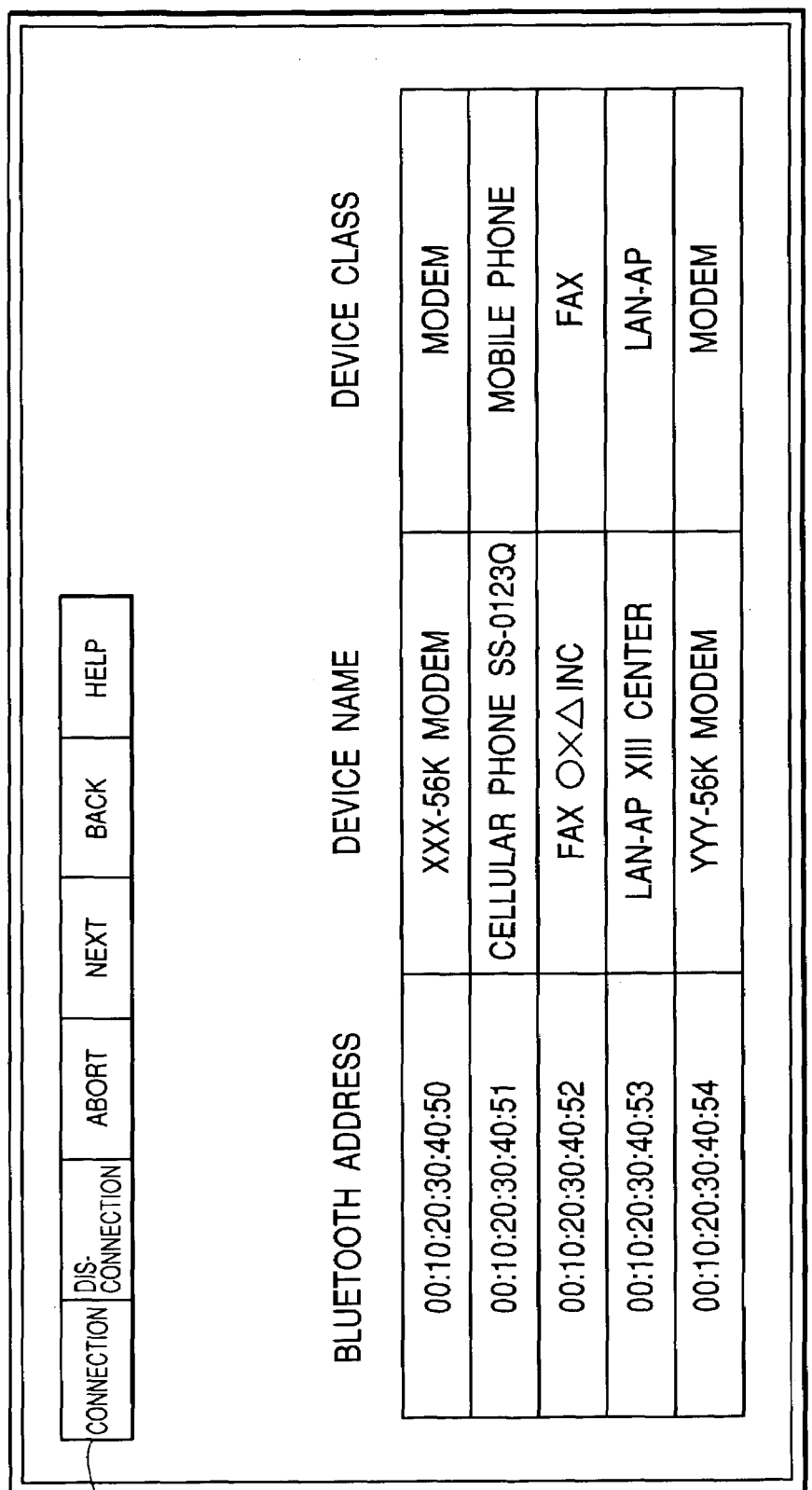
FIG. 5 is a diagram showing a display example provided by the digital camera serving as the wireless communication control apparatus according to the first embodiment when an inquiry response signal is received.

FIG. 5 is a diagram showing an example device list displayed on the display unit 210 at step S322 in the process sequence in FIG. 3. Upon the depression of a connection button 501 (the Internet connection request at step S310 in FIG. 3), the device class is examined and selected.

With this arrangement, wherever the digital camera 100 is located it can make an Internet connection consonant with the capabilities of a device at a nearby access point. As a modification, a wireless communication technique, such as Bluetooth, may be employed to search only for a limited number of device types, so that devices not related to the Internet connection are not displayed. As another modification, the wireless communication control process unit 202 may employ a wireless communication function whereby a search is made only for a limited number of devices, and may search for and display on the display unit 212 only the devices in a group that can be connected to the Internet.

Second Embodiment

A second embodiment of the present invention will now be described while referring to FIGS. 6 and 7.

Since the configuration of a data communication system having a wireless communication control apparatus according to this embodiment is the same as that in FIG. 1, and since the arrangement for the functional sections of a digital camera, including a wireless communication function for the wireless communication control apparatus according to the embodiment, is the same as that in FIG. 2, FIGS. 1 and 2 will also be referred to during the explanation given for the second embodiment.

FIG. 6 is a diagram, showing an example device priority table, in which the contents of the priority memory unit 211 in FIG. 2 are represented, for the priority levels of devices. connected to the wireless communication control apparatus according to the second embodiment of the present invention.

In FIG. 6, priority (1) 601 to priority (3) 603 are entered in a device priority table 600. These priorities represent the connection order for the AP that is a selected device. An entry 604 indicates that priority (1) 601 is for a LAN-AP; an entry 605 indicates that priority (2) 602 is for a modem; and an entry 606 indicates that priority (3) 603 is for a cellular phone (a mobile telephone).

Figure 7:
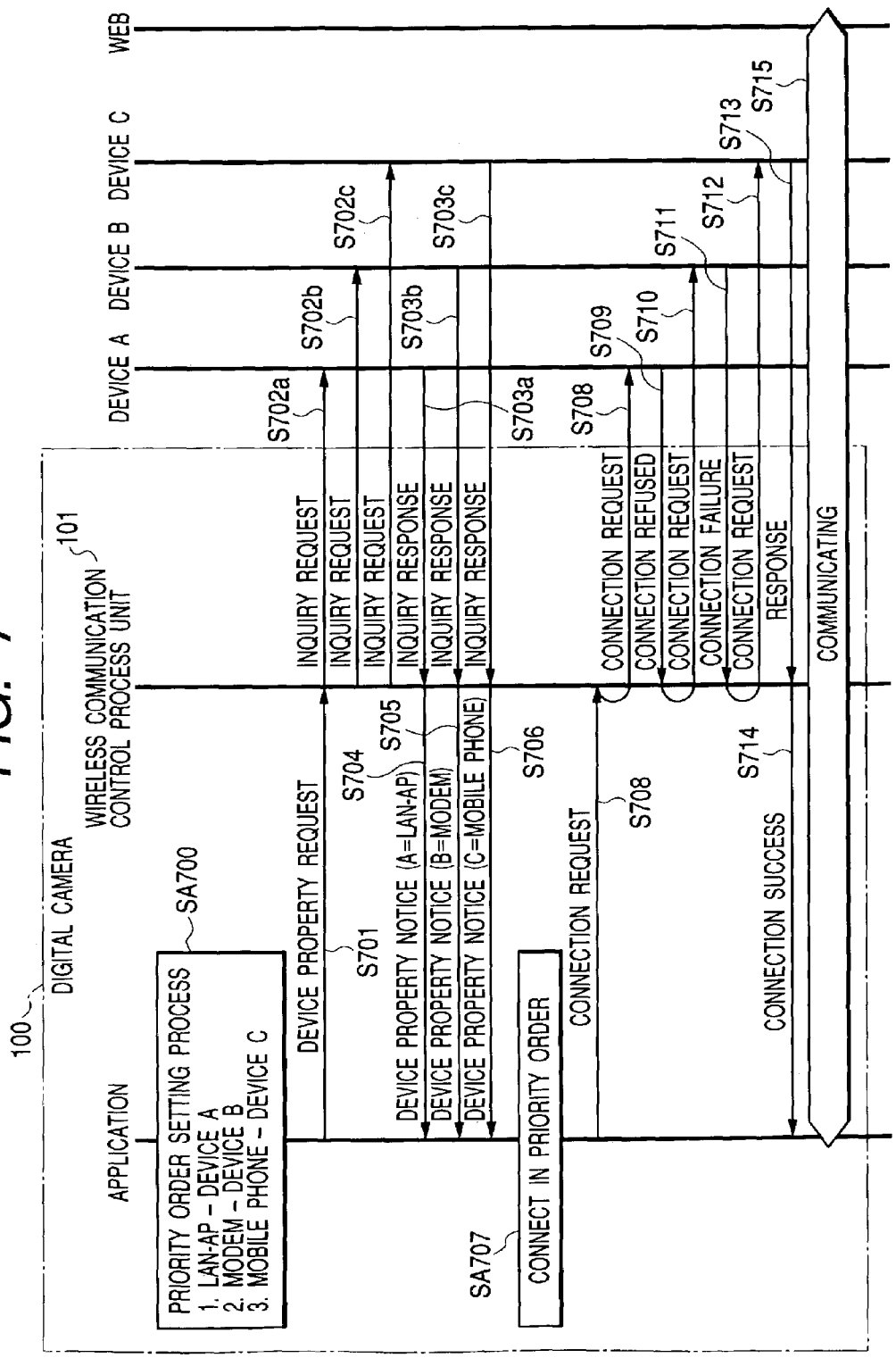
FIG. 7 is a diagram showing a processing sequence, for the wireless communication control apparatus according to the second embodiment of the present invention, for performing communication between a digital camera and an access point when the priority order is provided for the device classes.

FIG. 7 is a diagram showing the process sequences for the connections made, in accordance with the priorities shown in FIG. 6, between a digital camera 100 and the individual APs.

In FIG. 7, the priority setting process is performed at step SA700. In this embodiment, in the descending order of the priorities, a device A represents a LAN-AP 101, a device B represents a modem 102, and a device C represents a cellular phone (a mobile phone) 103.

First, when a connection is established, the Internet connection application (system control unit 201) transmits to a wireless communication control process unit 202 a request for a search for device attributes (step S701). Thereafter, the wireless communication control process unit 202 transmits inquiry request signals to the devices A, B and C (steps S702a, S702b and S702c). Upon the reception of an inquiry request signal, each of the devices A, B and C transmits an inquiry response signal to the digital camera 100 (steps S703a, S703b and S703c). Then, in accordance with the received inquiry response signals, the wireless communication control process unit 202 transmits to the application device attributes (steps S704, S705 and S706), sorting the connection destinations in accordance with the priority order.

Next, the application attempts to connect to the devices in the priority order (step SA707).

First, the digital camera 100 transmits a connection request to the device A having priority (1) (step S708). In this embodiment, assume that a connection rejection has been received from the device A (step S709). Then, the digital camera transmits a connection request to the device B having priority (2) (step S710). In this case, again assume that the connection has failed (step S711). Following this, the application transmits a connection request to the device C having priority (3) (step S712), and receives a response signal (step S713). In this case, the wireless communication control process unit 202 notifies the application that the connection was successful (step S714), and activates a protocol required to begin communication using the Internet (step S715).

It should be noted that at steps S708, S710 and S712, as well as at steps S334 and S344 in FIG. 3, the connection request is issued in accordance with a property (stored in the communication setting information memory unit 210) corresponding to the device class (attribute) of the access point.

Further, in this embodiment, the sequence indicates that a connection has finally been successful. As a modification, when all connections fail, the wireless communication process unit 202 transmits a connection failure signal to the application. And in accordance with the reason for the connection failure and with the application type, the wireless communication control process unit 202 may attempt a reconnection beginning with the device having priority (1), or may attempt a reconnection while a timer is employed and the count it provides indicates that several seconds have elapsed.

As another modification, in order to reduce the connection period, a device attribute request may be issued for each priority, and an inquiry request signal may be transmitted to sort (filter) the devices in accordance with their priorities. Further, as an additional modification, a wireless communication technique, such as Bluetooth, may be employed for searching for only a limited number of device types. With this technique, only Internet accessible devices will be detected, in order, beginning with the AP attribute having the highest priority, and devices not related to an Internet connection will not be displayed. As another modification, the wireless communication control process unit 202 may employ a wireless communication function whereby a search is made only for a limited number of device types, and using this function, a search is made only for a group of Internet accessible devices, beginning with the AP for which the attribute has the highest priority, that are displayed on a display unit 212.

With the above described arrangement, the access point is set in accordance with the intent of a user, such as is represented by a low connection charge or easy access, and a connection is established in accordance with the access point. As a result, an Internet connection can be made in a manner that more closely reflects the intent of the user.

Third Embodiment

A third embodiment of the present invention will now be described while referring to FIGS. 8 to 10.

Since the configuration of a data communication system having a wireless communication control apparatus according to a third embodiment of the present invention is the same as that in FIG. 1, and since the arrangement of the functional sections of a digital camera having a wireless communication function for the wireless communication control apparatus according to this embodiment is the same as that in FIG. 2, FIGS. 1 and 2 will also be referred to during the description given for the third embodiment. It should be noted that, in this embodiment, the setting shown in FIG. 4 is not required for a communication setting information memory unit 210, and instead, a table shown in FIG. 9, which will be described later, is registered in a RAM 215.

Figure 8:
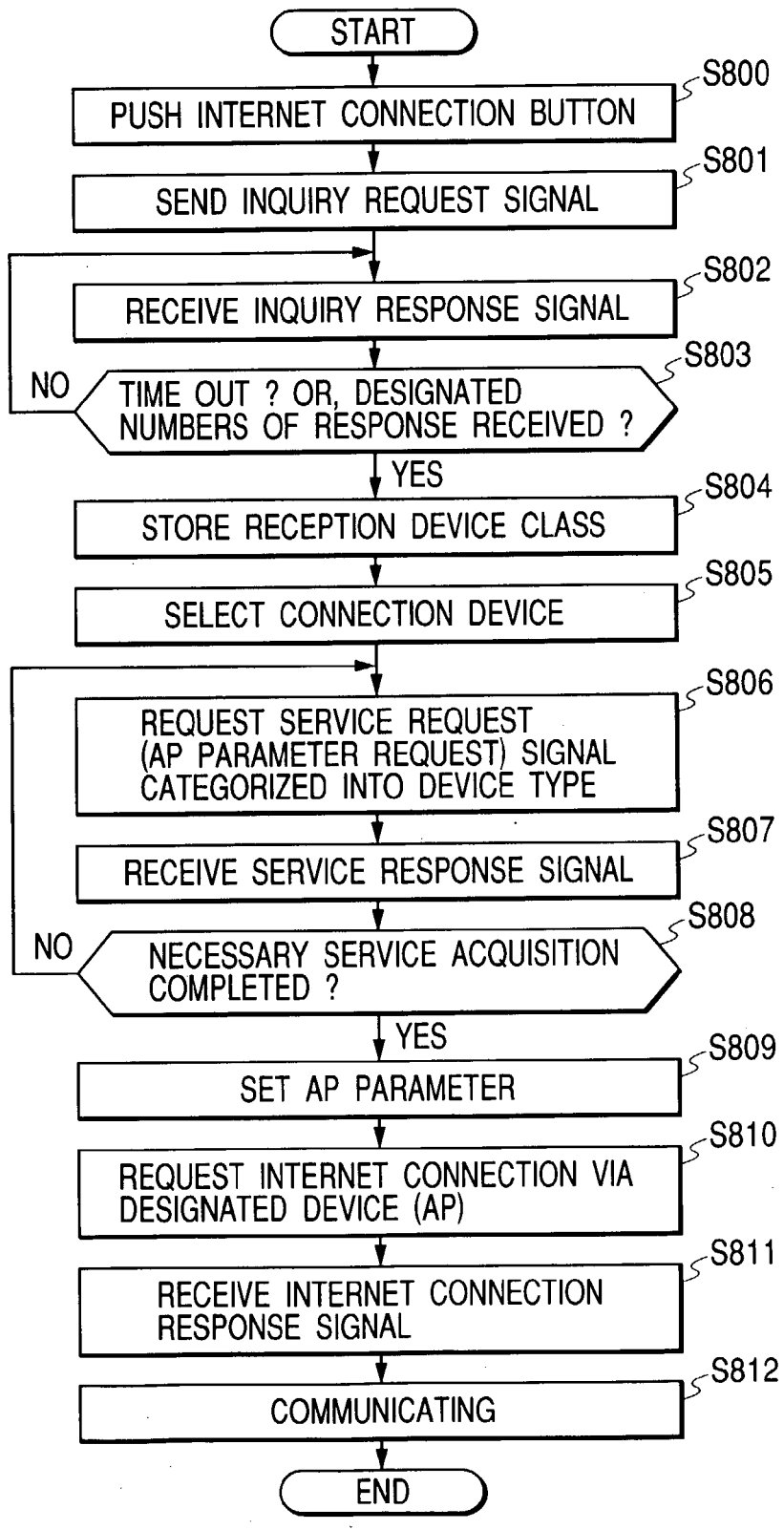
FIG. 8 is a flowchart showing the processing performed by a wireless communication control apparatus according to a third embodiment of the present invention when transmitting a service request for a parameter required for the Internet connection.

FIG. 8 is a flowchart showing the processing performed by the wireless communication control apparatus according to the third embodiment for an Internet connection between a digital camera 100 and an AP.

First, an Internet connection button is depressed by the application for the digital camera 100 (step S800). Then, an inquiry request signal is issued (step S801), and an inquiry response signal is received (step S802). The signal transmission and reception is performed by a wireless communication HW unit 213. This process is repeated a number of times equivalent to that of the designated responses, or until a predetermined period has elapsed (step S804). When responses are received from devices, the classes of these devices are stored (step S803), and a device to be connected is selected (step S805). In this process, as is shown in FIG. 5, the device classes are displayed on a display unit 212, and an appropriate device is selected by the operation of a manipulation unit 207.

Following this, the digital camera 100 transmits to the selected device a service request that differs depending on the device type, i.e., a request signal for a parameter required for the connection to an AP (step S806), and receives a service response signal from the AP (step S807). This process is repeated until all the required parameter information has been obtained (step S808). Then, after all the required parameter information has been obtained, the AP parameter is set (step S809), and a request for the connection to the Internet is issued through a designated device (AP) (step S810). Thereafter, an Internet connection response signal is received (step S811) and the Internet communication is enabled (step S812).

FIG. 9 is a diagram in which is shown an example service request list table, required for the individual device classes provided for the wireless communication control apparatus according to the third embodiment of the present invention. In FIG. 9, a modem 902, a mobile phone 903 and a LAN-AP 904 are provided as access point types 900, and in an entry 901 a service request list is entered for each class. When the device class is the modem 902, the service requests are a profile, an AP telephone number, a DHCP/DNS server and a protocol type. A similar list is provided when the device class is the mobile phone 903 or the LAN-AP 904. This list table in FIG. 9 is used as a determination reference at step S808 in FIG. 8. That is, when the LAN-AP is selected at step S805, at steps S806 to S808, the profile, the protocol type and the information for the DHCP/DNS server are obtained by requesting the LAN-AP 101. However, when the DHCP/DNS server is not included in the service request list 901, the information for the DHCP/DNS server is not requested. And when, for example, the protocol type is an IPv6, the information for the DHCP/DNS server is not required.

FIG. 10 is a diagram showing example parameter settings after a service request has been issued to the LAN-AP 904 that was selected.

In FIG. 10, a LAN-AP 1003 is indicated in an access point type area 1000. When the LAN-AP 1003 is selected, the entries in a service request list 1001 represent a profile, a protocol type and a DHCP/DNS server (depending on the protocol type, such as an IPv6, this may not be required). The values of these parameters are a PAN profile 1006, an IPv(6) 1005 and a NULL 1004. In this case, the values indicate that the AP parameter setting process at step S809 in FIG. 8 has been performed.

As is described above, since the parameter data for a service required for an AP to be connected are obtained from the AP, the usability can be improved without requiring a user to perform a property set up for each AP class in advance.

The objectives of the present invention can also be implemented by supplying, to an apparatus or a system, a storage medium on which software program code that implements the functions of the embodiments is stored, and by permitting the computer (the CPU or the MPU) of the apparatus or the system to read the program code from the storage medium.

In this case, the software program code itself implements the above embodiments, and the program code constitutes the present invention, and the storage medium on which the program code is stored constitutes the present invention.

Further, the storage medium for supplying the program code can be, for example, a floppy (trademark) disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card or a ROM.

In addition, the present invention also includes program code such that the functions of the embodiments can be implemented, not only when the program code is executed by a computer, but also when the program code cooperates with the operating system (OS) or another application program run by the computer.

Moreover, the present invention also includes a mode wherein program code supplied to a computer is stored in a memory provided for the function extension board of the computer or for a function extension unit connected to the computer, and wherein, based on an instruction in the program code, a CPU provided for the function extension board or the function extension unit performs part or all of the actual processing required to implement the functions of the embodiments.

The shapes and structures of the individual sections in the embodiments are merely examples that can be used to implement the present invention, and the technical scope of the present invention should not limited to them. That is, the present invention can be variously implemented without departing from the spirit or the essential feature of the invention.

What is claimed is:

1. A computer readable storage medium embodying a control program, for a wireless communication apparatus that performs a wireless communication with an access point, which, when executed by a computer processor, carries out a method to establish a connection with a network through the access point, comprising the steps of:

judging a class of the access point including a mobile phone;

selecting a type of parameter in accordance with the class of the access point, selecting the type of parameter for establishing the connection with the network through the mobile phone if the class of the access point is the mobile phone;

transmitting to the access point a request signal for requesting data of the parameter of the type selected at the selecting step required to access to the access point, transmitting to the mobile phone the request signal for requesting the data of the parameter of the selected type for establishing the connection with the network through the mobile phone if the class of the access point is the mobile phone;

acquiring the data of the parameter from the access point, acquiring the data of the parameter of the selected type for establishing the connection with the network through the mobile phone if the class of the access point is the mobile phone; and establishing the connection with the network in accordance with the data of the parameter acquired at the acquiring step, wherein the data of the parameter include contents of profile of the access point that were not pre-stored in the wireless communication apparatus in advance.

2. The computer readable storage medium according to claim 1, wherein, at the judgment step, an inquiry signal is transmitted to the access point, and the class of the access point is judged based on a response signal to the inquiry signal from the access point.

3. A method for performing a wireless communication by a wireless communication apparatus with an access point and establishing a connection with a network through the access point, comprising the steps of:

judging a class of the access point including a mobile phone;

selecting a type of parameter in accordance with the class of the access point, selecting the type of parameter for establishing the connection with the network through the mobile phone if the class of the access point is the mobile phone;

transmitting to the access point a request signal for requesting data of the parameter of the type selected at the selecting step required to access to the access point, transmitting to the mobile phone the request signal for requesting the data of the parameter of the selected type for establishing the connection with the network through the mobile phone if the class of the access point is the mobile phone;

acquiring the data of the parameter from the access point, acquiring the data of the parameter of the selected type for establishing the connection with the network through the mobile phone if the class of the access point is the mobile phone; and establishing the connection with the network in accordance with the data of the parameter acquired at the acquiring step, wherein the data of the parameter include contents of profile of the access point that were not pre-stored in the wireless communication apparatus in advance.

4. A method according to claim 3, wherein, at the judgment step, an inquiry signal is transmitted to the access point, and the class of the access point is judged based on a response signal to the inquiry signal from the access point.

5. A wireless communication apparatus, for performing wireless communication with an access point, comprising:

a connection unit for establishing a connection with a network through the access point;

a judgment unit for judging a class of the access point including a mobile phone;

a selection unit for selecting a type of parameter in accordance with the class of the access point, selecting the type of parameter for establishing the connection with the network through the mobile phone if the class of the access point is the mobile phone;

a transmission unit for transmitting to the access point a request signal for requesting data of the parameter of the type selected by the selection unit required to access to the access point, transmitting to the mobile phone the request signal for requesting the data of the parameter of the selected type for establishing the connection with the network through the mobile phone if the class of the access point is the mobile phone; and an acquisition unit for obtaining the data of the parameter from the access point, acquiring the data of the parameter of the selected type for establishing the connection with the network through the mobile phone if the class of the access point is the mobile phone, wherein the connection unit establishes the connection with the network in accordance with the data of the parameter acquired by the acquisition unit, and wherein the data of the parameter include contents of profile of the access point that were not pre-stored in the wireless communication apparatus in advance.

6. A wireless communication apparatus according to claim 5, wherein said judgment unit transmits an inquiry signal to the access point, and judges the class of the access point based on a response signal to the inquiry signal from the access point.

7. A method for performing a wireless communication by a wireless communication apparatus with an access point and establishing a connection with a network through the access point, comprising the steps of:

judging a class of the access point including a mobile phone;

selecting types of parameters in accordance with an attribute of the access point, selecting the types of parameters for establishing the connection with the network through the mobile phone if the class of the access point is the mobile phone;

transmitting a request signal to the access point for requesting data of the parameters of the types selected at said selecting step required to access to the access point, transmitting to the mobile phone the request signal for requesting the data of the parameters of the selected types for establishing the connection with the network through the mobile phone if the class of the access point is the mobile phone;

acquiring data of a parameter of one of the types selected at said selecting step from the access point, wherein each of data of the parameter is repeatedly acquired at the acquiring step until all the data of the parameters of types selected at said selecting step is acquired from the access point, acquiring the data of the parameters of the selected types for establishing the connection with the network through the mobile phone if the class of the access point is the mobile phone; and establishing the connection with the network in accordance with the data of the parameters acquired at the acquiring step, wherein the data of the parameters include contents of profile of the access point that were not pre-stored in the wireless communication apparatus in advance.

8. A wireless communication apparatus, for performing wireless communication with an access point, comprising:

a connection unit for establishing a connection with a network through the access point;

a judgment unit for judging a class of the access point including a mobile phone;

a selection unit for selecting types of parameters in accordance with an attribute of the access point, selecting the types of parameters for establishing the connection with the network through the mobile phone if the class of the access point is the mobile phone;

a transmission unit for transmitting to the access point a request signal for requesting data of the parameters of the types selected by the selection unit required to access to the access point, transmitting to the mobile phone the request signal for requesting the data of the parameters of the selected types for establishing the connection with the network through the mobile phone if the class of the access point is the mobile phone;

an acquisition unit for obtaining data of a parameter of one of the types selected by the selection unit from the access point, wherein the acquisition unit repeatedly acquires each of data of the parameter until all the data of the parameters of the types selected by the selection unit is acquired from the access point, acquiring the data of the parameters of the selected types for establishing the connection with the network through the mobile phone if the class of the access point is the mobile phone;

the connection unit establishes the connection with the network in accordance with the data of the parameters obtained by the acquisition unit, and wherein the data of the parameters include contents of profile of the access point that were not pre-stored in the wireless communication apparatus in advance.

* * * * *